(12) United States Patent
Shiraishi (10) Patent No.: US 9,836,268 B2
(45) Date of Patent: Dec. 5, 2017

(54) AVATAR DISPLAYING SYSTEM, USER TERMINAL, AND PROGRAM

(71) Applicant: COLOPL, INC., Tokyo (JP)

(72) Inventor: Taichiro Shiraishi, Saitama (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/358,056

(22) Filed: Nov. 21, 2016

(65) Prior Publication Data
US 2017/0153863 A1   Jun. 1, 2017

(30) Foreign Application Priority Data
Dec. 1, 2015 (JP) ................. 2015-234650

(51) Int. Cl.
| | |
|---|---|
| A63F 13/12 | (2006.01) |
| G06F 3/14 | (2006.01) |
| A63F 13/537 | (2014.01) |
| G06F 3/01 | (2006.01) |
| G06T 13/40 | (2011.01) |

(Continued)

(52) U.S. Cl.
CPC .......... *G06F 3/1454* (2013.01); *A63F 13/537* (2014.09); *A63F 13/56* (2014.09); *A63F 13/58* (2014.09); *G06F 3/012* (2013.01); *G06F 3/013* (2013.01); *G06T 13/40* (2013.01); *A63F 13/211* (2014.09); *A63F 13/212* (2014.09); *A63F 13/213* (2014.09); *A63F 13/26* (2014.09); *A63F 13/323* (2014.09); *A63F 13/34* (2014.09); *A63F 13/5255* (2014.09)

(58) Field of Classification Search
CPC ...................................... A63F 13/12
See application file for complete search history.

(56) References Cited

U.S. PATENT DOCUMENTS

| | | | | |
|---|---|---|---|---|
| 6,009,458 A | * | 12/1999 | Hawkins | ............. A63F 3/00075 463/1 |
| 2006/0105838 A1 | * | 5/2006 | Mullen | .................... A63F 13/00 463/31 |
| 2015/0258432 A1 | * | 9/2015 | Stafford | ................ A63F 13/213 463/32 |

FOREIGN PATENT DOCUMENTS

JP   2000-244886 A   9/2000

OTHER PUBLICATIONS

Office Action in JP Patent Application No. 2015-234650, dated Apr. 4, 2016.

(Continued)

*Primary Examiner* — Omkar Deodhar
(74) *Attorney, Agent, or Firm* — Hauptman Ham, LLP (57) ABSTRACT

An avatar displaying system capable of selectively sharing user posture information from a first terminal to a second terminal. The first terminal includes a user posture detecting unit configured to detect user posture information. The first terminal further includes a sharing permission/prohibition determining unit configured to determine whether or not to share the user posture information of the first user with the second user. The first terminal further includes a transmission unit configured to transmit the user posture information of the first user to the second terminal in response to a determination to share the user posture information of the first user with the second user. A second terminal includes an image generating unit configured to generate the avatar image representing the first user based on the user posture information of the first user. The second terminal further includes a display unit configured to display the avatar image.

18 Claims, 7 Drawing Sheets

(51) Int. Cl.
*A63F 13/58* (2014.01)
*A63F 13/56* (2014.01)
A63F 13/26 (2014.01)
A63F 13/211 (2014.01)
A63F 13/213 (2014.01)
A63F 13/5255 (2014.01)
A63F 13/34 (2014.01)
A63F 13/212 (2014.01)
A63F 13/323 (2014.01)

(56) References Cited

OTHER PUBLICATIONS

Decision to Grant a Patent in JP Patent Application No. 2015-234650, dated Aug. 29, 2016.

* cited by examiner

AVATAR DISPLAYING SYSTEM, USER TERMINAL, AND PROGRAM

RELATED APPLICATIONS

The present application claims priority to Japanese Application Number 2015-234650, filed Dec. 1, 2015, the disclosure of which is hereby incorporated by reference herein in its entirety.

BACKGROUND

This disclosure relates to an avatar displaying system, a user terminal, and a non-transitory computer readable medium for storing a program.

In Japanese Patent Application Laid-open No. 2000-244886, the following technology is disclosed. In a video conference system in which a plurality of users each conduct a video conference with use of a user station, information on movement of the head of each user is transmitted to the user station of another user. An animation is formed based on this information such that the movement of a head of an avatar follows the movement of the head of the user.

However, in the technology of Japanese Patent Application Laid-open No. 2000-244886, the movement of the head of the avatar always follows the movement of the head of the user.

SUMMARY

This disclosure has been made in view of the above-mentioned point, and has an object of at least one embodiment of this disclosure is to provide an avatar displaying system, a user terminal, and a non-transitory computer readable medium for storing a program, which are capable of selectively sharing the movement of a head or a line of sight of a user with another user.

In order to help solve the above-mentioned problem, according to at least one embodiment of this disclosure, there is provided an avatar displaying system. The avatar displaying system includes a first terminal to be used by a first user. The avatar displaying system further includes a second terminal to be used by a second user. The avatar displaying system is configured to cause the second terminal to display an avatar image representing the first user in a virtual reality space. The first terminal includes a user posture detecting means for detecting user posture information including at least one of a head direction or a line of sight of the first user. The first terminal further includes a user attribute storage means for storing attribute information relating to the first user. The first terminal further includes a sharing permission/prohibition determining means for determining whether or not to share the user posture information of the first user with the second user based on the attribute information. The first terminal further includes a transmission means for transmitting the user posture information of the first user to the second terminal in response to a determination to share the user posture information of the first user with the second user. The second terminal includes an image generating means for generating the avatar image representing the first user in the virtual reality space based on the user posture information of the first user when the user posture information of the first user is received from the first terminal. The second terminal further includes a display means for displaying the avatar image.

Further, according to at least one embodiment of this disclosure, there is provided an avatar displaying system, including a first terminal to be used by a first user and a second terminal to be used by a second user. The avatar displaying system is configured to cause the second terminal to display an avatar image representing the first user in a virtual reality space. The first terminal includes a user posture detecting means for detecting user posture information including at least one of a head direction or a line of sight of the first user. The first terminal further includes a transmission means for transmitting the user posture information of the first user to the second terminal. The second terminal includes a sharing permission/prohibition determining means for determining whether or not to share the user posture information of the first user, which is received from the first terminal, with the second user based on attribute information relating to the first user. The second terminal further includes an image generating means for generating the avatar image representing the first user in the virtual reality space based on the user posture information of the first user in response to a determination to share the user posture information of the first user with the second user; and display means for displaying the avatar image.

Further, according to at least one embodiment of this disclosure, there is provided a user terminal, which is usable as a first terminal in an avatar displaying system including the first terminal to be used by a first user and a second terminal to be used by a second user and being configured to cause the second terminal to display an avatar image representing the first user in a virtual reality space. The user terminal includes a user posture detecting means for detecting user posture information including at least one of a head direction or a line of sight of the first user. The user terminal further includes a user attribute storage means for storing attribute information relating to the first user. The user terminal further includes a sharing permission/prohibition determining means for determining whether or not to share the user posture information of the first user with the second user based on the attribute information. The user terminal further includes a transmission means for transmitting the user posture information of the first user to the second terminal in response to a determination to share the user posture information of the first user with the second user.

Further, according to at least one embodiment of this disclosure, there is provided a user terminal, which is to be used as a second terminal in an avatar displaying system including a first terminal to be used by a first user and the second terminal to be used by a second user and being configured to cause the second terminal to display an avatar image representing the first user in a virtual reality space. The user terminal includes a reception means for receiving, from the first terminal, user posture information including at least one of a head direction or a line of sight of the first user, which is detected in the first terminal. The user terminal further includes a sharing permission/prohibition determining means for determining whether or not to share the user posture information of the first user, which is received from the first terminal, with the second user based on attribute information relating to the first user. The user terminal further includes an image generating means for generating the avatar image representing the first user in the virtual reality space based on the user posture information of the first user in response to a determination to share the user posture information of the first user with the second user. The user terminal further includes a display means for displaying the avatar image.

Further, according to at least one embodiment of this disclosure, there is provided a non-transitory computer readable medium for storing a program for causing a user terminal being a first terminal in an avatar displaying system, which includes the first terminal to be used by a first user and a second terminal to be used by a second user and is configured to cause the second terminal to display an avatar image representing the first user in a virtual reality space. The first terminal is configured to execute the program to function as a user posture detecting means for detecting user posture information including at least one of a head direction or a line of sight of the first user; user attribute storage means for storing attribute information relating to the first user. The first terminal is further configured to execute the program to function as a sharing permission/prohibition determining means for determining whether or not to share the user posture information of the first user with the second user based on the attribute information. The first terminal is further configured to execute the program to function as a transmission means for transmitting the user posture information of the first user to the second terminal in response to a determination to share the user posture information of the first user with the second user.

Further, according to at least one embodiment of this disclosure, there is provided a non-transitory computer readable medium for storing a program for causing a user terminal being a second terminal in an avatar displaying system, which includes a first terminal to be used by a first user and the second terminal to be used by a second user and is configured to cause the second terminal to display an avatar image representing the first user in a virtual reality space. The second terminal is configured to execute the program to function as a reception means for receiving, from the first terminal, user posture information including at least one of a head direction or a line of sight of the first user, which is detected in the first terminal The first terminal is further configured to execute the program to function as a sharing permission/prohibition determining means for determining whether or not to share the user posture information of the first user, which is received from the first terminal, with the second user based on attribute information relating to the first user The first terminal is further configured to execute the program to function as an image generating means for generating the avatar image representing the first user in the virtual reality space based on the user posture information of the first user in response to a determination to share the user posture information of the first user with the second user The first terminal is further configured to execute the program to function as a display means for displaying the avatar image.

According to this disclosure, selectively sharing the movement of the head or the line of sight of the user with another user is possible.

DESCRIPTION OF THE EMBODIMENTS

First, contents of at least one embodiment of this disclosure are listed and described. At least one embodiment of this disclosure has the following configuration.

(Item 1) An avatar displaying system includes a first terminal to be used by a first user and a second terminal to be used by a second user. The avatar displaying system is configured to cause the second terminal to display an avatar image representing the first user in a virtual reality space. The first terminal includes a user posture detecting means for detecting user posture information including at least one of a head direction or a line of sight of the first user. The first terminal further includes a user attribute storage means for storing attribute information relating to the first user. The first terminal further includes a sharing permission/prohibition determining means for determining whether or not to share the user posture information of the first user with the second user based on the attribute information. The first terminal further includes a and transmission means for transmitting the user posture information of the first user to the second terminal in response to a determination to share the user posture information of the first user with the second user. The second terminal includes an image generating means for generating the avatar image representing the first user in the virtual reality space based on the user posture information of the first user when the user posture information of the first user is received from the first terminal. The second terminal further includes a display means for displaying the avatar image.

(Item 2) An avatar displaying system according to Item 1, in which, when the user posture information of the first user is not received from the first terminal, the image generating means generates a default avatar image representing the first user.

(Item 3) An avatar displaying system according to Item 1 or 2, in which the attribute information includes one of an experience value and an ability value of the first user in a computer game.

(Item 4) An avatar displaying system according to Item 3, in which, when the one of the experience value and the ability value is larger than a predetermined value, the sharing permission/prohibition determining means determines to share the user posture information of the first user with the second user, whereas when the one of the experience value and the ability value is smaller than the predetermined value, the sharing permission/prohibition determining means determines not to share the user posture information of the first user with the second user.

(Item 5) An avatar displaying system according to Item 1 or 2, in which the attribute information includes a value relating to one of a frequency, a depth, and a proximity of communication between the first user and the second user.

(Item 6) An avatar displaying system according to any one of Items 1 to 5, in which the avatar image generated based on the user posture information of the first user includes an image of an avatar that directs at least one of a face or eyes thereof in a direction indicated by the user posture information of the first user.

(Item 7) An avatar displaying system according to any one of Items 1 to 6, in which each of the first terminal and the second terminal includes a terminal including a head mounted display.

(Item 8) An avatar displaying system includes a first terminal to be used by a first user and a second terminal to be used by a second user. The avatar displaying system is configured to cause the second terminal to display an avatar image representing the first user in a virtual reality space. The first terminal includes a user posture detecting means for detecting user posture information including at least one of a head direction or a line of sight of the first user. The first terminal further includes a transmission means for transmitting the user posture information of the first user to the second terminal. The second terminal includes a sharing permission/prohibition determining means for determining whether or not to share the user posture information of the first user, which is received from the first terminal, with the second user based on attribute information relating to the first user. The second terminal further includes an image generating means for generating the avatar image representing the first user in the virtual reality space based on the user posture information of the first user in response to a determination to share the user posture information of the first user with the second user. The second terminal further includes a display means for displaying the avatar image.

(Item 9) A user terminal, which usable as a first terminal in an avatar displaying system including the first terminal to be used by a first user and a second terminal to be used by a second user and being configured to cause the second terminal to display an avatar image representing the first user in a virtual reality space. The user terminal includes a user posture detecting means for detecting user posture information including at least one of a head direction or a line of sight of the first user. The user terminal further includes a user attribute storage means for storing attribute information relating to the first user. The user terminal further includes a sharing permission/prohibition determining means for determining whether or not to share the user posture information of the first user with the second user based on the attribute information. The user terminal further includes a transmission means for transmitting the user posture information of the first user to the second terminal in response to a determination to share the user posture information of the first user with the second user.

(Item 10) A user terminal, usable as a second terminal in an avatar displaying system including a first terminal to be used by a first user and the second terminal to be used by a second user and being configured to cause the second terminal to display an avatar image representing the first user in a virtual reality space. The user terminal includes a reception means for receiving, from the first terminal, user posture information including at least one of a head direction or a line of sight of the first user, which is detected in the first terminal. The user terminal further includes a sharing permission/prohibition determining means for determining whether or not to share the user posture information of the first user, which is received from the first terminal, with the second user based on attribute information relating to the first user. The user terminal further includes an image generating means for generating the avatar image representing the first user in the virtual reality space based on the user posture information of the first user in response to a determination to share the user posture information of the first user with the second user; and display means for displaying the avatar image.

(Item 11) A non-transitory computer readable medium for storing a program for causing a user terminal being a first terminal in an avatar displaying system, which includes the first terminal to be used by a first user and a second terminal to be used by a second user and is configured to cause the second terminal to display an avatar image representing the first user in a virtual reality space. The first terminal is configured to execute the program to function as a user posture detecting means for detecting user posture information including at least one of a head direction or a line of sight of the first user; user attribute storage means for storing attribute information relating to the first user. The first terminal is further configured to execute the program to function as a sharing permission/prohibition determining means for determining whether or not to share the user posture information of the first user with the second user based on the attribute information. The first terminal is further configured to execute the program to function as a transmission means for transmitting the user posture information of the first user to the second terminal in response to a determination to share the user posture information of the first user with the second user.

(Item 12) A non-transitory computer readable medium for storing a program for causing a user terminal being a second terminal in an avatar displaying system, which includes a first terminal to be used by a first user and the second terminal to be used by a second user and is configured to cause the second terminal to display an avatar image representing the first user in a virtual reality space. The second terminal is configured to execute the program to function as a reception means for receiving, from the first terminal, user posture information including at least one of a head direction or a line of sight of the first user, which is detected in the first terminal. The second terminal is further configured to execute the program to function as a sharing permission/prohibition determining means for determining whether or not to share the user posture information of the first user, which is received from the first terminal, with the second user based on attribute information relating to the first user. The second terminal is further configured to execute the program to function as an image generating means for generating the avatar image representing the first user in the virtual reality space based on the user posture information of the first user in response to a determination to share the user posture information of the first user with the second user. The second terminal is further configured to execute the program to function as a display means for displaying the avatar image.

In the following, detailed description is given of at least one embodiment of this disclosure with reference to the drawings.

Figure 1:
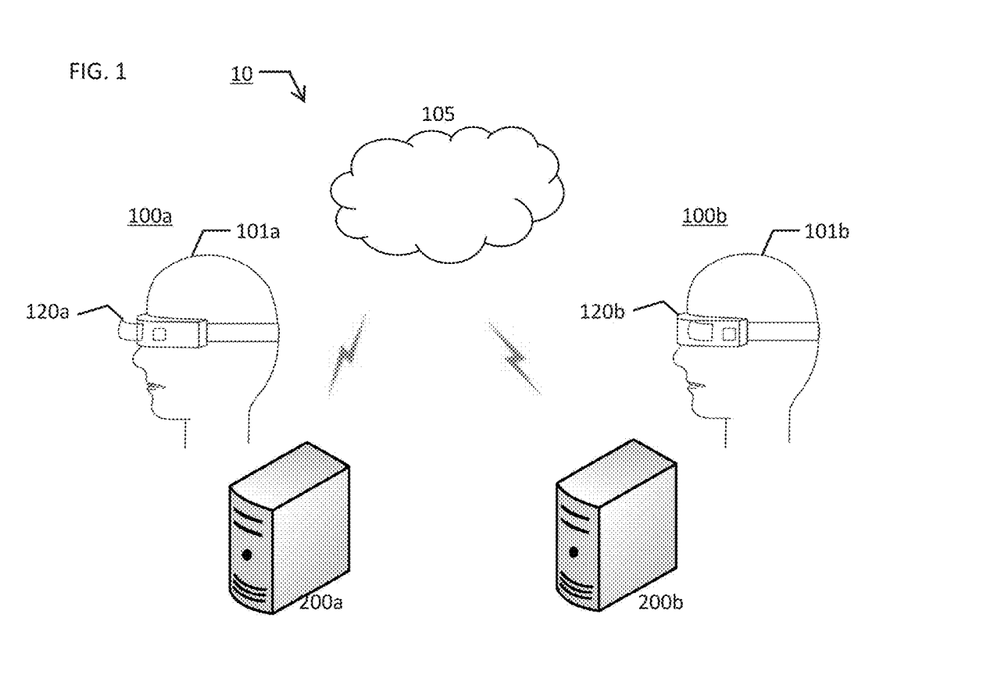
FIG. 1 is a view of a schematic configuration of an avatar displaying system 10 according to at least one embodiment of this disclosure.

FIG. 1 is a view of a schematic configuration of an avatar displaying system 10 according to at least one embodiment of this disclosure. The avatar displaying system 10 includes a first sub-system (first terminal) 100a usable by a first user 101a, and a second sub-system (second terminal) 100b usable by a second user 101b. The first sub-system 100a and the second sub-system 100b are connected to each other so as to enable mutual communication via a network 105. The network 105 may be any type of network, e.g., the Internet or a local area network (LAN). In FIG. 1, only two sub-systems 100a and 100b are illustrated, but the avatar displaying system 10 may include any number of similar sub-systems usable by different users, respectively.

The first sub-system 100a includes a head mounted display (hereinafter referred to as "HMD") 120a and an image generating device 200a. The image generating device 200a is configured to generate an image representing a virtual reality space to be presented to the first user 101a, to thereby cause the HMD 120a to display the generated virtual reality space image. The virtual reality space image to be displayed on the HMD 120a includes an avatar that visually represents the appearance, e.g., the face or the body, of the second user 101b. The first user 101a can communicate with the second user 101b in the virtual reality space via the avatar of the second user 101b. Similarly, the second sub-system 100b includes an HMD 120b and an image generating device 200b. The image generating device 200b is configured to generate an image representing a virtual reality space to be presented to the second user 101b, to thereby cause the HMD 120b to display the generated virtual reality space image. The virtual reality space image to be displayed on the HMD 120b includes an avatar of the first user 101a. The second user 101b can communicate with the first user 101a in the virtual reality space via the avatar of the first user 101a.

Figure 2:
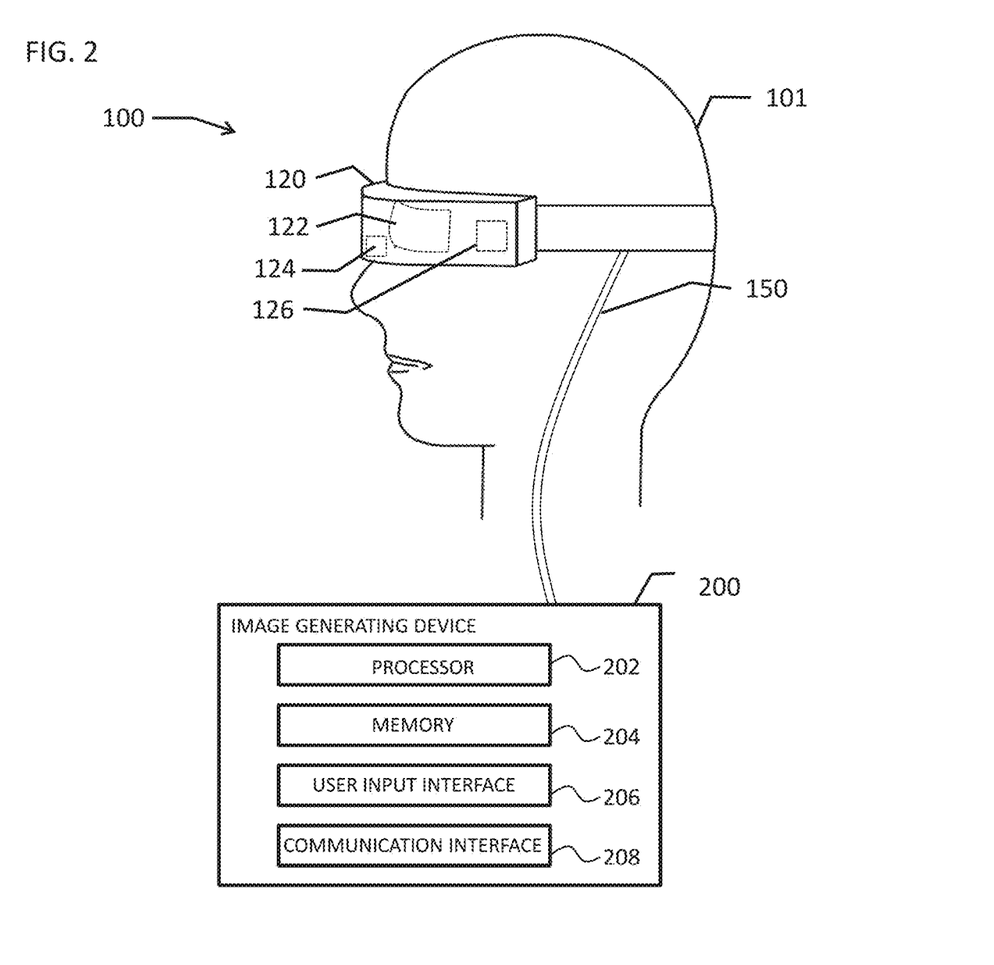
FIG. 2 is a hardware configuration diagram of an HMD system 100 according to at least one embodiment of this disclosure.

FIG. 2 is a hardware configuration diagram of an HMD system 100 according to at least one embodiment of this disclosure. The HMD system 100 corresponds to each of the first sub-system 100a and the second sub-system 100b illustrated in FIG. 1. As described above, the HMD system 100 includes an HMD 120 and an image generating device 200. The HMD 120 and the image generating device 200 are, as an example, electrically connected to each other by a cable 150 so as to enable mutual communication. Instead of the cable 150, wireless connection may be used.

The HMD 120 is a display device to be used by being worn on a head of a user 101. The HMD 120 includes a display 122, an eye tracking device (hereinafter referred to as "ETD") 124, and a sensor 126. In at least one embodiment, either or both of the ETD 124 or the sensor 126 is omitted. The HMD 120 may further include a speaker (headphones).

The display 122 is configured to present an image in a field of view of the user 101 wearing the HMD 120. For example, the display 122 may be configured as a non-transmissive display or a partially transmissive display. In this case, the sight of the outside world of the HMD 120 is blocked (or partially blocked) from the field of view of the user 101, and the user 101 can see only the image displayed on the display 122. On the display 122, for example, an image generated with use of computer graphics is displayed. As an example of the image generated with use of computer graphics, there is given a virtual reality image obtained by forming an image of a virtual reality space (for example, a world created in a computer game). As described above, the virtual reality space image includes an avatar of another user that communicates with the user 101 wearing the HMD 120. As an example of such an avatar, an avatar representing another player of poker in a computer game, an avatar representing an opponent of a fighting game, or an avatar representing a person to chat with in the virtual reality space may be used.

The ETD 124 is configured to track the movement of the eyeballs of the user 101, to thereby detect the direction of the line of sight of the user 101. For example, the ETD 124 includes an infrared light source and an infrared camera. The infrared light source is configured to irradiate the eye of the user 101 wearing the HMD 120 with infrared rays. The infrared camera is configured to take an image of the eye of the user 101 irradiated with the infrared rays. The infrared rays are reflected on the surface of the eye of the user 101, but the reflectance of the infrared rays differs between the pupil and a part other than the pupil. In the image of the eye of the user 101 taken by the infrared camera, the difference in reflectance of the infrared rays appears as the contrast of the image. Based on this contrast, the pupil is identified in the image of the eye of the user 101, and further the direction of the line of sight of the user 101 is detected based on the position of the identified pupil.

The sensor 126 is a sensor configured to detect the direction of the head of the user 101 wearing the HMD 120. Examples of the sensor 126 include a magnetic sensor, an angular velocity sensor, an acceleration sensor, or a combination thereof. When the sensor 126 is a magnetic sensor, an angular velocity sensor, or an acceleration sensor, the sensor 126 is built into the HMD 120, and is configured to output a value (magnetic, angular velocity, or acceleration value) based on the direction or the movement of the HMD 120. By processing the value output from the sensor 126 by an appropriate method, the direction of the head of the user 101 wearing the HMD 120 is calculated. The direction of the head of the user 101 can be used to change a display image of the display 122 so as to follow the movement of the head of the user 101 when the head is moved. For example, when the user 101 turns his/her head to the right (or left, upward, or downward), the display 122 may display a virtual sight in the right (or left, upward, or downward) of the user in the virtual reality space.

As the sensor 126, a sensor provided outside of the HMD 120 may be employed. For example, the sensor 126 may be an infrared sensor separated from the HMD 120 and installed at a fixed position in a room. When an infrared emitting member or an infrared reflecting marker formed on the surface of the HMD 120 is detected with use of the infrared sensor, the direction of the head of the user 101 wearing the HMD 120 can be identified. Such a type of sensor 126 is sometimes called a position tracking sensor.

The image generating device 200 is a device configured to generate an image to be displayed on the HMD 120. The image generating device 200 at least includes a processor 202, a memory 204, a user input interface 206, and a communication interface 208. The image generating device 200 may be achieved as, for example, a personal computer, a game console, a smart phone, a tablet terminal, and the like.

The memory 204 has stored therein at least an operating system and an image generating program. The operating system is a computer program for controlling the entire operation of the image generating device 200. The image generating program is a computer program for the image generating device 200 to achieve respective functions of image generating processing to be described later. The memory 204 can further temporarily or permanently store data generated by the operation of the image generating device 200. Specific examples of the memory 204 include a read only memory (ROM), a random access memory (RAM), a hard disk, a flash memory, and an optical disc.

The processor 202 is configured to read out a program stored in the memory 204, to thereby execute processing in accordance with the program. When the processor 202 executes the image generating program stored in the memory 204, various functions of the image generating processing to be described later are achieved. The processor 202 includes a central processing unit (CPU) and a graphics processing unit (GPU).

The user input interface 206 is configured to receive inputs for operating the image generating device 200 from the user 101 of the HMD system 100. Specific examples of the user input interface 206 include a game controller, a touch pad, a mouse, and a keyboard.

The communication interface 208 is a network interface for communicating to/from other devices via the network. For example, the image generating device 200*a* of the first sub-system 100*a* and the image generating device 200*b* of the second sub-system 100*b* illustrated in FIG. 1 communicate to/from each other via the network 105 with use of the communication interfaces 208 thereof.

Figure 3:
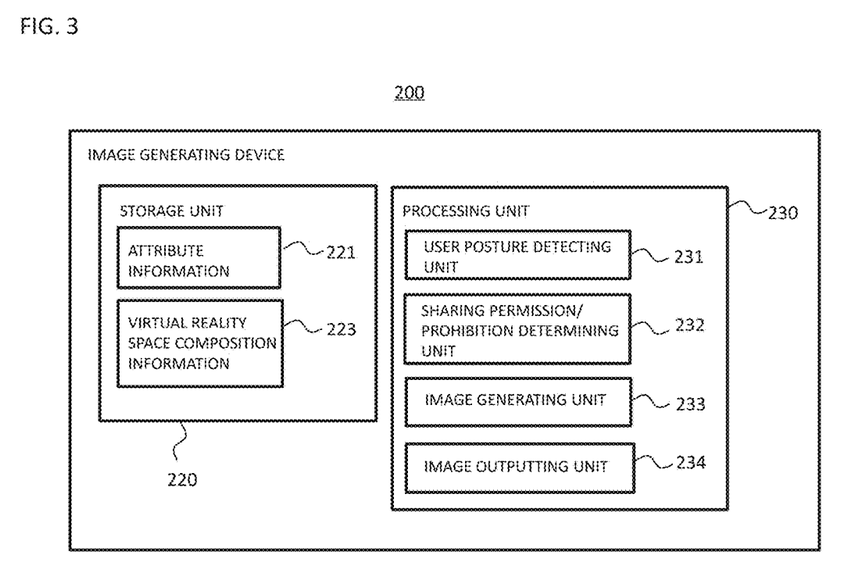
FIG. 3 is a block diagram of a functional configuration of an image generating device 200 according to at least one embodiment of this disclosure.

FIG. 3 is a block diagram of a functional configuration of the image generating device 200 according to at least one embodiment of this disclosure. The image generating device 200 includes a storage unit 220 and a processing unit 230. The processing unit 230 further includes a user posture detecting unit 231, a sharing permission/prohibition determining unit 232, an image generating unit 233, and an image outputting unit 234. In at least one embodiment, the storage unit 220 corresponds to the memory 204 illustrated in FIG. 1. In at least one embodiment, the processing unit 230 and the respective units 231 to 234 included in the processing unit 230 represent functions of image generating processing according to this disclosure, which are achieved by the processor 202 illustrated in FIG. 1 reading out an image generating program stored in the memory 204 and executing the image generating program.

The storage unit 220 stores attribute information 221 relating to the user 101. The attribute information 221 relating to the user 101 is used as a material for determining whether or not to share the user posture information with another user in communication between the users (details thereof are described later). For example, the attribute information 221 relating to the user 101 may include an experience value or an ability value of the user 101 in a computer game. Specific examples of the computer game may include card games such as playing cards (e.g., poker) and Hanafuda (Japanese floral playing cards), table games such as mah-jong, Japanese chess, and game of Go, fighting games, role-playing games, and sports games such as tennis, soccer, and baseball. The experience value of the user 101 is an index representing the level of proficiency of the user 101 when the computer game is played. For example, a distinction is made between whether the user 101 is a beginner or an expert of the game. The ability value of the user 101 is a parameter setting value of the ability that can be exerted by the user 101 when the computer game is played, and, for example, includes parameter values such as attack power or defense power during a battle in a fighting game or the like. The experience value and the ability value may be represented as numerical values, or may have classifications such as "beginner, intermediate, or expert" or "large, middle, or small attack power". When the experience value or the ability value is represented as numerical values, as an example, the experience value or the ability value may be superior as the numerical value is larger. The experience value and the ability value include concepts called in names such as skill, rank, and level.

Further, the attribute information 221 relating to the user 101 may include an index value representing the relationship between the users in the virtual reality space. As the relationship between the users, for example, indexes such as frequency, depth, and proximity of the communication between the users can be used. The frequency of the communication represents how frequent the user 101 and another certain user hold communication or interaction (battles, conversations, and the like in the game) with each other (e.g., whether the users met for the first time or play together online once a week). The depth of the communication represents the qualitative contact level in the communication between the user 101 and another certain user, and, for example, relates to the quality of the communication experience between the users, e.g., what kind of game the users played together (whether the game is a card game, a fighting game, or a chat), how the users interacted (whether they met one-on-one, they met each other as one of a large number of people, they only exchanged ordinary greetings, or they discussed about their hobbies). The proximity of the communication represents the sense of distance or the level of intimacy formed between the user 101 and another certain user (for example, whether or not they register each other as friends). Those indexes may be numerical values, or classifications such as "registered as friend".

The storage unit 220 further stores virtual reality space composition information 223. The virtual reality space composition information 223 is data relating to arrangement positions, shapes, and colors of various objects (including avatars) present in the virtual reality space, which are used for generating the virtual reality space image.

The user posture detecting unit 231 is configured to detect user posture information including at least one of a head direction or a line of sight of the user 101. For example, the user posture detecting unit 231 may detect the head direction of the user 101 wearing the HMD 120 based on the output value from the sensor 126. Alternatively, the user posture detecting unit 231 may detect the direction of the line of sight of the user 101 based on the infrared image obtained from the ETD 124. Further, the user posture detecting unit 231 may detect both of the head direction and the line of sight of the user 101.

The sharing permission/prohibition determining unit 232 is configured to determine whether or not to share the user posture information (head direction and/or line of sight) based on the attribute information 221. Details of the determination method are described later.

The image generating unit 233 is configured to generate a virtual reality space image by computer graphics processing based on the virtual reality space composition information 223 stored in the storage unit 220. An example of the virtual reality space image generated by the image generating unit 233 is an image representing a virtual reality space of a computer game (e.g., a card game including poker, a fighting game, and a chat). The virtual reality space image includes an image representing an avatar of another user that communicates with the user 101 in the virtual reality space. When the user posture information of the user corresponding to the avatar is permitted to be shared to the user 101, the image generating unit 233 controls the avatar image based on the user posture information. For example, the image generating unit 233 may generate an avatar image in which the avatar directs its face or eyes in the direction indicated by the user posture information.

Figure 4:
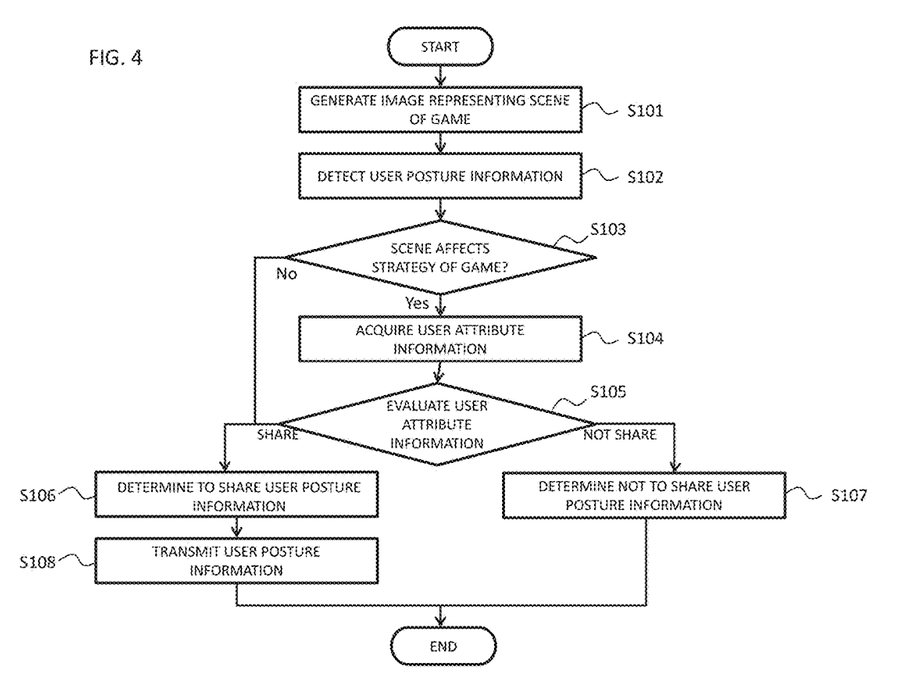
FIG. 4 is a flow chart of an operation of an image generating device 200a according to at least one embodiment of this disclosure.
Figure 5:
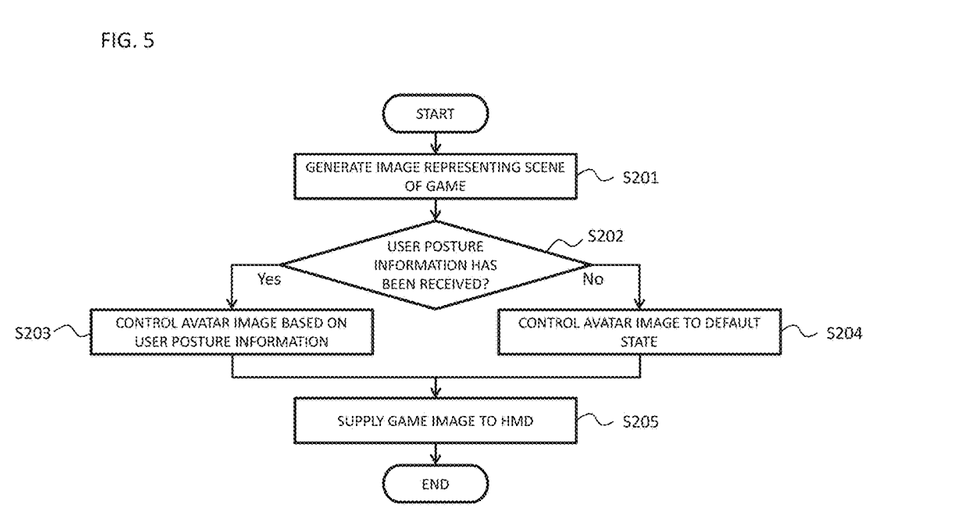
FIG. 5 is a flow chart of an operation of an image generating device 200b according to at least one embodiment of this disclosure.

FIG. 4 and FIG. 5 are flow charts of the operation of the image generating device 200 according to at least one embodiment of this disclosure. In at least one embodiment, FIG. 4 corresponds to the operation of the image generating device 200*a* of the first sub-system 100*a*. In at least one embodiment, FIG. 5 corresponds to the operation of the image generating device 200*b* of the second sub-system 100*b*. The flow charts of FIG. 4 and FIG. 5 are examples of processing for displaying an avatar image representing the first user 101*a* of the first sub-system 100*a* on the HMD 120*b* of the second sub-system 100*b*. In the following, the description refers to a case of playing a poker computer game as appropriate, but this description is merely exemplary and this disclosure is not limited thereto. This disclosure is applicable to any system configured to execute processing for displaying an avatar of a user.

First, referring to FIG. 4, in Step S101, the image generating unit 233 of the image generating device 200a (hereinafter referred to as "image generating unit 233a") generates a game image representing each scene in accordance with the progress of the computer game (poker). Examples of the scene of poker include a scene of dealing cards to each of the players, a scene in which each player bets chips, and a scene in which each player exchanges a part of his/her hand with a card stacked on the table. The game image of each scene generated by the image generating unit 233a also includes an avatar image of another player playing together (e.g., an avatar image in which the face or the upper body of another player is drawn) in addition to the image representing his/her hand. The avatars of other players may be drawn so as to surround a periphery of a table on which the poker is played, or each avatar may be simply arranged while facing the front in each screen area obtained by vertically and laterally dividing the screen.

In Step S102, the user posture detecting unit 231 of the image generating device 200a (hereinafter referred to as "user posture detecting unit 231a") detects the user posture information of the first user 101a wearing the HMD 120a. As described above, the user posture information includes at least one of the head direction or the line of sight. The user posture detecting unit 231a detects the head direction of the first user 101a based on the output value from the sensor 126, and further detects the line of sight of the first user 101a based on the infrared image obtained from the ETD 124.

In Step S103, the sharing permission/prohibition determining unit 232 of the image generating device 200a (hereinafter referred to as "sharing permission/prohibition determining unit 232a") determines whether or not the present scene of the computer game is a scene that affects the strategy in a game. Examples of a scene that affects the strategy in poker include a scene in which the player bets chips, and a scene in which the player exchanges his/her hand with a card on the table. In contrast, a scene of firstly dealing cards to each player is a scene that does not affect the strategy of a game. For scene determination, as an example, the sharing permission/prohibition determining unit 232a may use a game progress flag assigned to each scene in advance for managing the progress of the game. When the present scene is a scene that affects the strategy, the processing proceeds to Step S104, and otherwise, the processing proceeds to Step S106.

In Step S104, the sharing permission/prohibition determining unit 232a extracts the attribute information 221 relating to the first user 101a from the storage unit 220 of the image generating device 200a (hereinafter referred to as "storage unit 220a").

In Step S105, the sharing permission/prohibition determining unit 232a evaluates the attribute information 221 relating to the first user 101a, which is extracted from the storage unit 220a. In accordance with the evaluation result of the attribute information 221, the sharing permission/prohibition determining unit 232a determines whether to share (Step S106) or not share (Step S107) the user posture information of the first user 101a with the second user 101b of the second sub-system 100b.

For example, the attribute information 221 relating to the first user 101a includes an experience value or an ability value of the first user 101a in the computer game (poker). As an example, when the experience value or the ability value of the first user 101a is larger than a predetermined value (experience or ability is superior), in Step S106, the sharing permission/prohibition determining unit 232a determines to share the user posture information of the first user 101a with the second user 101b. On the other hand, when the experience value or the ability value of the first user 101a is smaller than a predetermined value (experience or ability is inferior), in Step S107, the sharing permission/prohibition determining unit 232a determines not to share the user posture information of the first user 101a with the second user 101b. For example, when the attribute information 221 classifies the first user 101a to a poker expert, the sharing permission/prohibition determining unit 232a determines to share the user posture information of the first user 101a with the second user 101b (Step S106). When the attribute information 221 classifies the first user 101a to a poker beginner, the sharing permission/prohibition determining unit 232a determines not to share the user posture information of the first user 101a with the second user 101b (Step S107).

Further, for example, the attribute information 221 relating to the first user 101a includes an index value representing the relationship (frequency, depth, proximity, and the like of communication) between the first user 101a and the second user 101b. As an example, when the attribute information 221 shows that the first user 101a registers the second user 101b as a friend, in Step S106, the sharing permission/prohibition determining unit 232a determines to share the user posture information of the first user 101a with the second user 101b. On the other hand, when the attribute information 221 does not show that the first user 101a registers the second user 101b as a friend, in Step S107, the sharing permission/prohibition determining unit 232a determines not to share the user posture information of the first user 101a with the second user 101b. Conversely, when the first user 101a does not register the second user 101b as a friend, the sharing permission/prohibition determining unit 232a may share the user posture information of the first user 101a with the second user 101b (Step S106), and when the first user 101a registers the second user 101b as a friend, the sharing permission/prohibition determining unit 232a may not share the user posture information of the first user 101a with the second user 101b (Step S107). Further, the sharing permission/prohibition determining unit 232a may determine whether or not to share the user posture information of the first user 101a with the second user 101b depending on not only whether or not the user is registered as a friend, but also the magnitude of the index value representing the frequency or the depth of the communication between the first user 101a and the second user 101b.

In Step S106, the sharing permission/prohibition determining unit 232a determines to share the user posture information of the first user 101a with the second user 101b even when the present scene of the computer game is determined as a scene that does not affect the strategy in Step S103 described above.

In response to a determination to share the user posture information of the first user 101a with the second user 101b (Step S106), in Step S108, the user posture information of the first user 101a is transmitted to the image generating device 200b of the second sub-system 100b via the communication interface 208. On the other hand, in response to a determination not to share the user posture information of the first user 101a with the second user 101b (Step S107), the user posture information of the first user 101a is not transmitted to the image generating device 200b of the second sub-system 100b.

Next, referring to FIG. 5, in Step S201, the image generating unit 233 of the image generating device 200b (hereinafter referred to as "image generating unit 233b") generates a game image representing each scene in accordance with the progress of the computer game (poker) similarly to and in synchronization with Step S101 of FIG. 4. The game image of each scene generated by the image generating unit 233b includes an avatar image representing the first user 101a of the first sub-system 100a.

In Step S202, the image generating unit 233b determines whether or not the user posture information of the first user 101a has been received from the image generating device 200a of the first sub-system 100a via the communication interface 208. When the user posture information of the first user 101a has been received, the processing proceeds to Step S203, and when the user posture information of the first user 101a has not been received, the processing proceeds to Step S204.

In Step S203, the image generating unit 233b controls the avatar image representing the first user 101a, which is included in the game image, based on the received user posture information of the first user 101a. As an example, the image generating unit 233b generates an avatar image in which the avatar representing the first user 101a directs the face or eyes of the avatar in the direction indicated by the user posture information (head direction and/or line of sight) of the first user 101a.

In Step S204, the image generating unit 233b controls the avatar image representing the first user 101a, which is included in the game image, to a default state. As an example, the image generating unit 233b generates an avatar image in which the avatar representing the first user 101a directs the face or eyes of the avatar in a default direction (e.g., frontal direction).

In Step S205, the image outputting unit 234 of the image generating device 200b supplies the game image (including the avatar image of the first user 101a) generated by the image generating unit 233b to the HMD 120b. With this, the HMD 120b displays the game image.

As described above, in the avatar displaying system 10 according to at least one embodiment of this disclosure, when the sharing of the user posture information of the first user 101a is permitted based on the attribute information 221 relating to the first user 101a, in the game image displayed on the HMD 120b of the second sub-system 100b, the movement of the face or the eyes of the avatar representing the first user 101a is controlled depending on the user posture information of the first user 101a. The user posture information of the first user 101a represents the head direction or the line of sight of the first user 101a, which is detected by the sensor 126 or the ETD 124 of the first sub-system 100a. Therefore, only when the sharing of the user posture information is permitted, the movement of the face or the eyes of the avatar of the first user 101a, which is displayed on the HMD 120b of the second sub-system 100b, can be synchronized with the actual head direction or line of sight of the first user 101a. For example, in a poker game, face reading of the opponent is one important element in the strategy of the game, and hence whether the movement of the face or the eyes of the avatar of the first user 101a matches with the actual head direction or line of sight of the first user 101a significantly affects the difficulty of the game for the second user 101b. In the avatar displaying system 10 of at least one embodiment, whether or not to cause the movement of the face or the eyes of the avatar to follow that of the actual user is determined depending on the game experience value (level) of the user or the relationship between the users, and thus the difficulty of the game can be adjusted. In this manner, in the computer game played in the virtual reality space, strategic gaming experience can be provided, and the amusement of the computer game can be improved.

Figure 6:
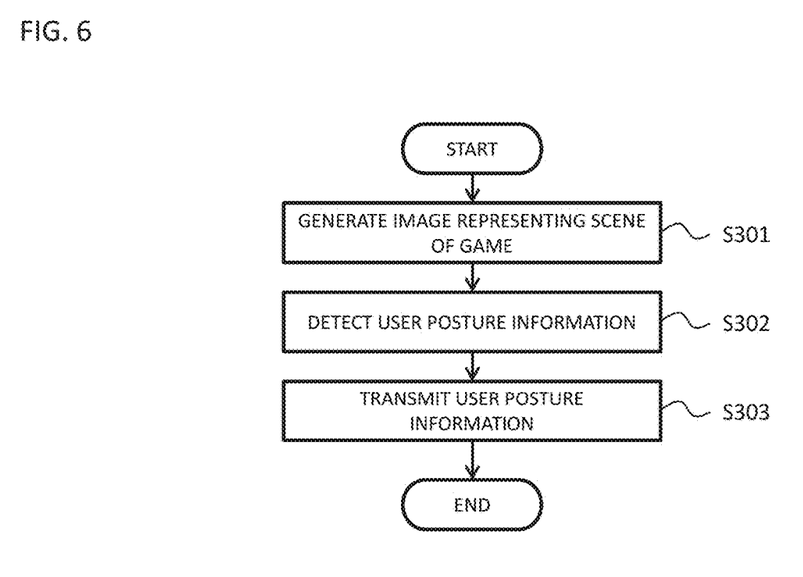
FIG. 6 is a flow chart of an operation of the image generating device 200a according to at least one embodiment of this disclosure.
Figure 7:
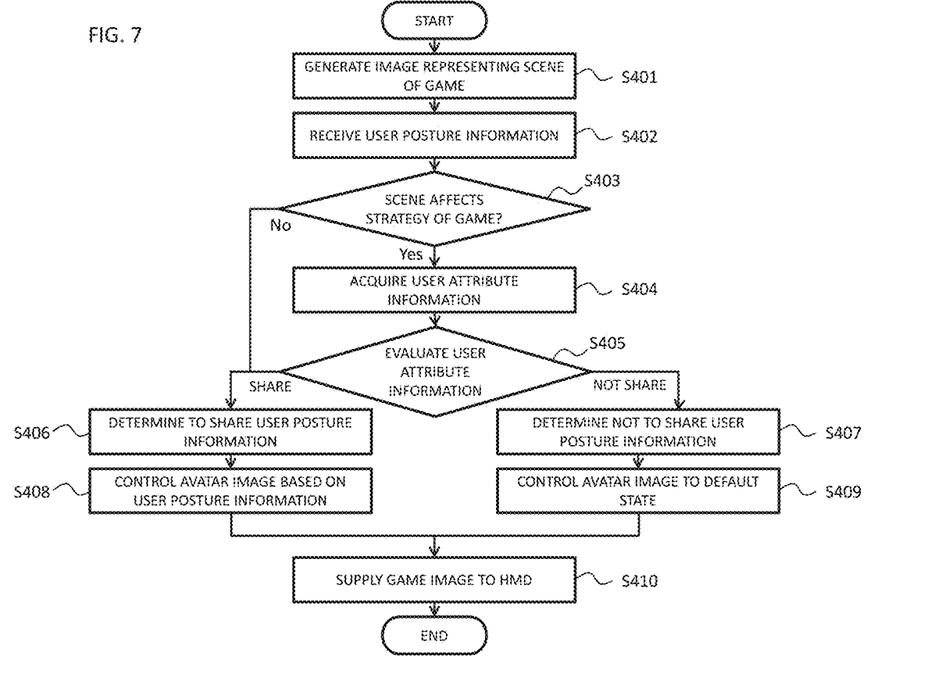
FIG. 7 is a flow chart of an operation of the image generating device 200b according to at least one embodiment of this disclosure.

FIG. 6 and FIG. 7 are flowcharts of at least one example of the operation of the image generating device 200 according to at least one embodiment of this disclosure. In at least one embodiment, FIG. 6 corresponds to the operation of the image generating device 200a of the first sub-system 100a. In at least one embodiment, FIG. 7 corresponds to the operation of the image generating device 200b of the second sub-system 100b. Similarly to FIG. 4 and FIG. 5, the flow charts of FIG. 6 and FIG. 7 represent the processing for displaying the avatar image representing the first user 101a of the first sub-system 100a on the HMD 120b of the second sub-system 100b, but differ from the case of FIG. 4 and FIG. 5 in that whether or not to share the user posture information is determined on the second sub-system 100b side.

Referring to FIG. 6, the processing of Step S301 and Step S302 is the same as the processing of Step S101 and Step S102 of FIG. 4. In next Step S303, without determining whether or not to permit sharing of the user posture information of the first user 101a, the user posture information of the first user 101a is transmitted to the image generating device 200b of the second sub-system 100b via the communication interface 208. That is, in the operation illustrated in the flow chart of FIG. 6, the user posture information of the first user 101a is provided unconditionally from the first sub-system 100a to the second sub-system 100b.

Next, referring to FIG. 7, the processing of Step S401 is the same as the processing of Step S201 of FIG. 5, and the game image including the avatar image of the first user 101a is generated by the image generating unit 233b. The game image represents each scene in accordance with the progress of the computer game (poker).

In Step S402, the user posture information of the first user 101a is received from the image generating device 200a of the first sub-system 100a via the communication interface 208.

The processing of Step S403 is similar to that of Step S103 of FIG. 4, and the sharing permission/prohibition determining unit 232 of the image generating device 200b (hereinafter referred to as "sharing permission/prohibition determining unit 232b") determines whether or not the present scene of the computer game is a scene that affects the strategy in a game. When the present scene is a scene that affects the strategy, the processing proceeds to Step S404, and otherwise, the processing proceeds to Step S406.

In Step S404, the sharing permission/prohibition determining unit 232b extracts the attribute information 221 relating to the first user 101a from the storage unit 220 of the image generating device 200b (hereinafter referred to as "storage unit 220b"). The attribute information 221 of the first user 101a stored in the storage unit 220b is, for example, an index value representing the relationship (frequency, depth, proximity, and the like of communication) between the first user 101a and the second user 101b. This attribute information (index value representing relationship between users) relates to both of the first user 101a and the second user 101b, and hence the attribute information may be stored not only in the storage unit 220a on the first sub-system 100a side but also in the storage unit 220b on the second sub-system 100b side. Alternatively, as the attribute information 221 of the first user 101a, for example, data relating to the experience value or the ability value of the first user 101a in the computer game may be transmitted from the image generating device 200*a* to the image generating device 200*b* in advance or together with the user posture information of the first user 101*a* (Step S303), to thereby be stored in the storage unit 220*b*.

In Step S405, the sharing permission/prohibition determining unit 232*b* evaluates the attribute information 221 relating to the first user 101*a*, which is extracted from the storage unit 220*b*. In accordance with the evaluation result of the attribute information 221, the sharing permission/prohibition determining unit 232*b* determines whether to share (Step S406) or not share (Step S407) the user posture information of the first user 101*a* with the second user 101*b*. The processing from Step S405 to Step S407 is the same as the processing from Step S105 to Step S107 of FIG. 4.

In response to a determination to share the user posture information of the first user 101*a* with the second user 101*b* (Step S406), in Step S408, the image generating unit 233*b* controls the avatar image representing the first user 101*a*, which is included in the game image, based on the user posture information of the first user 101*a* received in Step S402. As an example, the image generating unit 233*b* generates an avatar image in which the avatar representing the first user 101*a* directs its face or eyes in the direction indicated by the user posture information (head direction and/or line of sight) of the first user 101*a* (similar to Step S203 of FIG. 5).

On the other hand, in response to a determination not to share the user posture information of the first user 101*a* with the second user 101*b* (Step S407), in Step S409, the image generating unit 233*b* controls the avatar image representing the first user 101*a*, which is included in the game image, to the default state. As an example, the image generating unit 233*b* generates an avatar image in which the avatar representing the first user 101*a* directs its face or eyes in the default direction (e.g., frontal direction) (similar to Step S204 of FIG. 5).

The processing of Step S410 is the same as the processing of Step S205 of FIG. 5, and the game image (including the avatar image of the first user 101*a*) generated by the image generating unit 233*b* is supplied to the HMD 120*b*.

As described above, also in the operation example of FIG. 6 and FIG. 7, only when the sharing of the user posture information is permitted, the movement of the face or the eyes of the avatar of the first user 101*a*, which is displayed on the HMD 120*b* of the second sub-system 100*b*, can be synchronized with the actual head direction or line of sight of the first user 101*a*. With this, in the computer game played in the virtual reality space, strategic gaming experience can be provided, and the amusement of the computer game can be improved.

While a description has been given above on at least one embodiment of this disclosure, this disclosure is not limited thereto, and various modifications can be made without departing from the spirit of this disclosure.

What is claimed is:

1. An avatar displaying system, comprising:
a first terminal usable by a first user; and
a second terminal usable by a second user,
the avatar displaying system being configured to cause the second terminal to display an avatar image representing the first user in a virtual reality space,
the first terminal comprising:
a sensor for detecting user posture information, wherein the user posture information comprises at least one of a head direction of the first user or a line of sight of the first user;
a memory for storing attribute information comprising a predetermined condition associated with the first user or the avatar image;
a first processor for determining whether to share the user posture information of the first user with the second user if the predetermined condition is satisfied; and
a communication interface for transmitting the user posture information of the first user to the second terminal in response to a determination to share the user posture information of the first user with the second user,
the second terminal comprising:
a second processor for generating the avatar image representing the first user in the virtual reality space based on the user posture information of the first user when the user posture information of the first user is received from the first terminal; and
a head mounted display for displaying the avatar image.

2. The avatar displaying system according to claim 1, wherein, when the user posture information of the first user is not received from the first terminal, the second processor is configured to generate a default avatar image representing the first user.

3. The avatar displaying system according to claim 1, wherein the attribute information comprises at least one of an experience value or an ability value of the first user in a computer game.

4. The avatar displaying system according to claim 3, wherein, when at least one of the experience value or the ability value is larger than a predetermined value, the first processor is configured to determine to share the user posture information of the first user with the second user, when both of the experience value and the ability value is smaller than the predetermined value, the first processor is configured to determine not to share the user posture information of the first user with the second user.

5. The avatar displaying system according to claim 1, wherein the attribute information comprises a value relating to one of a frequency, a depth, or a proximity of communication between the first user and the second user.

6. The avatar displaying system according to claim 1, wherein the avatar image generated based on the user posture information of the first user comprises an image of an avatar that directs at least one of a face or eyes thereof in a direction indicated by the user posture information of the first user.

7. The avatar displaying system according to claim 1, wherein each of the first terminal and the second terminal comprises a head mounted display.

8. The avatar displaying system according to claim 2, wherein the attribute information comprises at least one of an experience value or an ability value of the first user in a computer game.

9. The avatar displaying system according to claim 8, wherein, when at least one of the experience value or the ability value is larger than a predetermined value, the first processor is configured to determine to share the user posture information of the first user with the second user, when both of the experience value and the ability value is smaller than the predetermined value, the first processor is configured to determine not to share the user posture information of the first user with the second user.

10. The avatar displaying system according to claim 2, wherein the attribute information comprises a value relating to one of a frequency, a depth, or a proximity of communication between the first user and the second user.

11. The avatar displaying system according to claim 2, wherein the avatar image generated based on the user posture information of the first user comprises an image of an avatar that directs at least one of a face or eyes thereof in a direction indicated by the user posture information of the first user.

12. The avatar displaying system according to claim 2, wherein each of the first terminal and the second terminal comprises a head mounted display.

13. The avatar displaying system according to claim 3, wherein the avatar image generated based on the user posture information of the first user comprises an image of an avatar that directs at least one of a face or eyes thereof in a direction indicated by the user posture information of the first user.

14. The avatar displaying system according to claim 4, wherein the avatar image generated based on the user posture information of the first user comprises an image of an avatar that directs at least one of a face or eyes thereof in a direction indicated by the user posture information of the first user.

15. The avatar displaying system according to claim 5, wherein the avatar image generated based on the user posture information of the first user comprises an image of an avatar that directs at least one of a face or eyes thereof in a direction indicated by the user posture information of the first user.

16. An avatar displaying system, comprising:
a first terminal usable by a first user; and
a second terminal usable by a second user,
the avatar displaying system being configured to cause the second terminal to display an avatar image representing the first user in a virtual reality space,
the first terminal comprising:
a sensor for detecting user posture information comprising at least one of a head direction or a line of sight of the first user; and
a communication interface for transmitting the user posture information of the first user to the second terminal,
the second terminal comprising:
a first processor for determining whether or not to share the user posture information of the first user, which is received from the first terminal, with the second user based on attribute information comprising a predetermined condition associated with the first user or the avatar image, the determining being based on whether the predetermined condition is satisfied;
a second processor for generating the avatar image representing the first user in the virtual reality space based on the user posture information of the first user in response to a determination to share the user posture information of the first user with the second user; and
a head mounted display for displaying the avatar image.

17. A user terminal comprising:
a sensor for detecting user posture information including at least one of a head direction or a line of sight of a first user;
a memory for storing attribute information comprising a predetermined condition associated with the first user or the avatar image;
a first processor for determining whether or not to share the user posture information of the first user with a second user if the predetermined condition is satisfied; and
a communication interface for transmitting the user posture information of the first user to the second terminal in response to a determination to share the user posture information of the first user with the second user.

18. A user terminal comprising:
a communication interface for receiving, from a first terminal, user posture information comprising at least one of a head direction or a line of sight of a first user;
a first processor for determining whether or not to share the user posture information of the first user with a second user based on attribute information comprising a predetermined condition associated with the first user or the avatar image, the determining being based on whether the predetermined condition is satisfied;
a second processor for generating the avatar image representing the first user in the virtual reality space based on the user posture information of the first user in response to a determination to share the user posture information of the first user with the second user; and
a head mounted display for displaying the avatar image.

* * * * *